(12) United States Patent
Poulsen et al.

(10) Patent No.: US 12,064,700 B2
(45) Date of Patent: Aug. 20, 2024

(54) GAMING UNIT

(71) Applicant: Yoli ApS, København NV (DK)

(72) Inventors: Anders Søndergaard Poulsen, København Ø (DK); Anders Skærlund Frandsen, Ølsted (DK)

(73) Assignee: Yoli ApS, København NV (DK)

(*) Notice: Subject to any disclaimer, the term of this patent is extended or adjusted under 35 U.S.C. 154(b) by 416 days.

(21) Appl. No.: 17/442,516

(22) PCT Filed: Mar. 19, 2020

(86) PCT No.: PCT/DK2020/050073
§ 371 (c)(1),
(2) Date: Sep. 23, 2021

(87) PCT Pub. No.: WO2020/192854
PCT Pub. Date: Oct. 1, 2020

(65) Prior Publication Data
US 2022/0168625 A1 Jun. 2, 2022

(30) Foreign Application Priority Data
Mar. 25, 2019 (DK) .......................... PA 2019 70181

(51) Int. Cl.
A63F 3/04 (2006.01)
A63F 3/00 (2006.01)
(Continued)

(52) U.S. Cl.
CPC ........ *A63F 3/0423* (2013.01); *A63F 3/00574* (2013.01); *A63F 3/00697* (2013.01);
(Continued)

(58) Field of Classification Search
CPC ................ A63F 3/0423; A63F 3/00574; A63F 3/00697; A63F 9/24; A63F 9/34;
(Continued)

(56) References Cited

U.S. PATENT DOCUMENTS 7,050,754 B1    5/2006  Marcus et al.
11,498,014 B1 * 11/2022  Aalund .................. A63H 33/26
(Continued)

FOREIGN PATENT DOCUMENTS

DE    102016000631 B3    4/2017
EP    0880035 A2    11/1998
(Continued)

OTHER PUBLICATIONS

FunGrowRightNow12: "Wireless Arduino Powered Chess" Apr. 1, 2012, retrieved from the internet: https://www.youtube.com/watch?v=dX37LFv8jWY.
(Continued)

*Primary Examiner* — Michael D Dennis
(74) *Attorney, Agent, or Firm* — Fox Rothschild LLP; Carol E. Thorstad-Forsyth

(57) ABSTRACT

Disclosed is a gaming unit for a gaming system, the gaming system comprising the gaming unit and a plurality of playing pieces, each playing piece of the plurality of playing pieces comprising a magnet and having an identifier. The gaming unit comprises: a play zone for arranging one or more playing pieces of the plurality of playing pieces on the gaming unit; a control unit; and a first magnetic unit configured to generate or alter a magnetic field for magnetically affecting one or more playing pieces arranged in the play zone. The first magnetic unit being operationally connected to the control unit. The control unit is configured to detect the identifier of a playing piece arranged in the play zone and responsive to the detection of one more particular identifiers generate a control signal controlling the first magnetic unit to generate or alter a magnetic field thereby magnetically affecting one or more playing pieces in the play zone.

5 Claims, 2 Drawing Sheets

(51) Int. Cl.
*A63F 9/24* (2006.01)
*A63F 9/34* (2006.01)

(52) U.S. Cl.
CPC .................. *A63F 9/24* (2013.01); *A63F 9/34* (2013.01); *A63F 2003/0063* (2013.01); *A63F 2003/00738* (2013.01); *A63F 2003/0426* (2013.01); *A63F 2009/2457* (2013.01); *A63F 2009/345* (2013.01)

(58) Field of Classification Search
CPC .... A63F 2003/0063; A63F 2003/00738; A63F 2003/0426; A63F 2009/2457; A63F 2009/345; A63F 13/28; A63F 13/98; A63F 13/245; A63F 33/042; A63F 13/00; A63F 33/04; A63F 3/00643
See application file for complete search history.

(56) References Cited

U.S. PATENT DOCUMENTS

| | | | |
|---|---|---|---|
| 2005/0047621 A1* | 3/2005 | Cranfill | B06B 1/045 381/396 |
| 2010/0041456 A1 | 2/2010 | Yu | |
| 2011/0272884 A1* | 11/2011 | Kraegeloh | A63F 3/00 273/237 |
| 2013/0012313 A1* | 1/2013 | Chen | A63F 13/2145 463/31 |
| 2015/0290545 A1 | 10/2015 | Barney et al. | |
| 2015/0339021 A1 | 11/2015 | Duteil et al. | |
| 2015/0375134 A1 | 12/2015 | Zhang et al. | |
| 2016/0067616 A1 | 3/2016 | Yim et al. | |
| 2018/0178113 A1 | 6/2018 | Knippen | |

FOREIGN PATENT DOCUMENTS

| | | |
|---|---|---|
| EP | 3085422 A1 | 10/2016 |
| GB | 2381211 A | 4/2003 |
| WO | 2015173246 A1 | 11/2015 |

OTHER PUBLICATIONS

Real-Time mLAB UPenn. Automatic ElectroMechanical Chess Board. Youtube [ online ] [video] . Retrieved from the Internet Oct. 1, 2019.https://www.youtube.com/watch?v=z5rtatj3B7E published Mar. 7, 2013.

Square off Square Off—A Chess Board with a Tech Twist. Youtube [online] [video] . Retrieved from the internet Sep. 30, 2019. https://www.youtube.com/watch?v=jKCwi6L8pHI published Oct. 19, 2016.

Search Report issued in Danish Patent Application No. PA 2019 70181 dated Oct. 4, 2019.

* cited by examiner

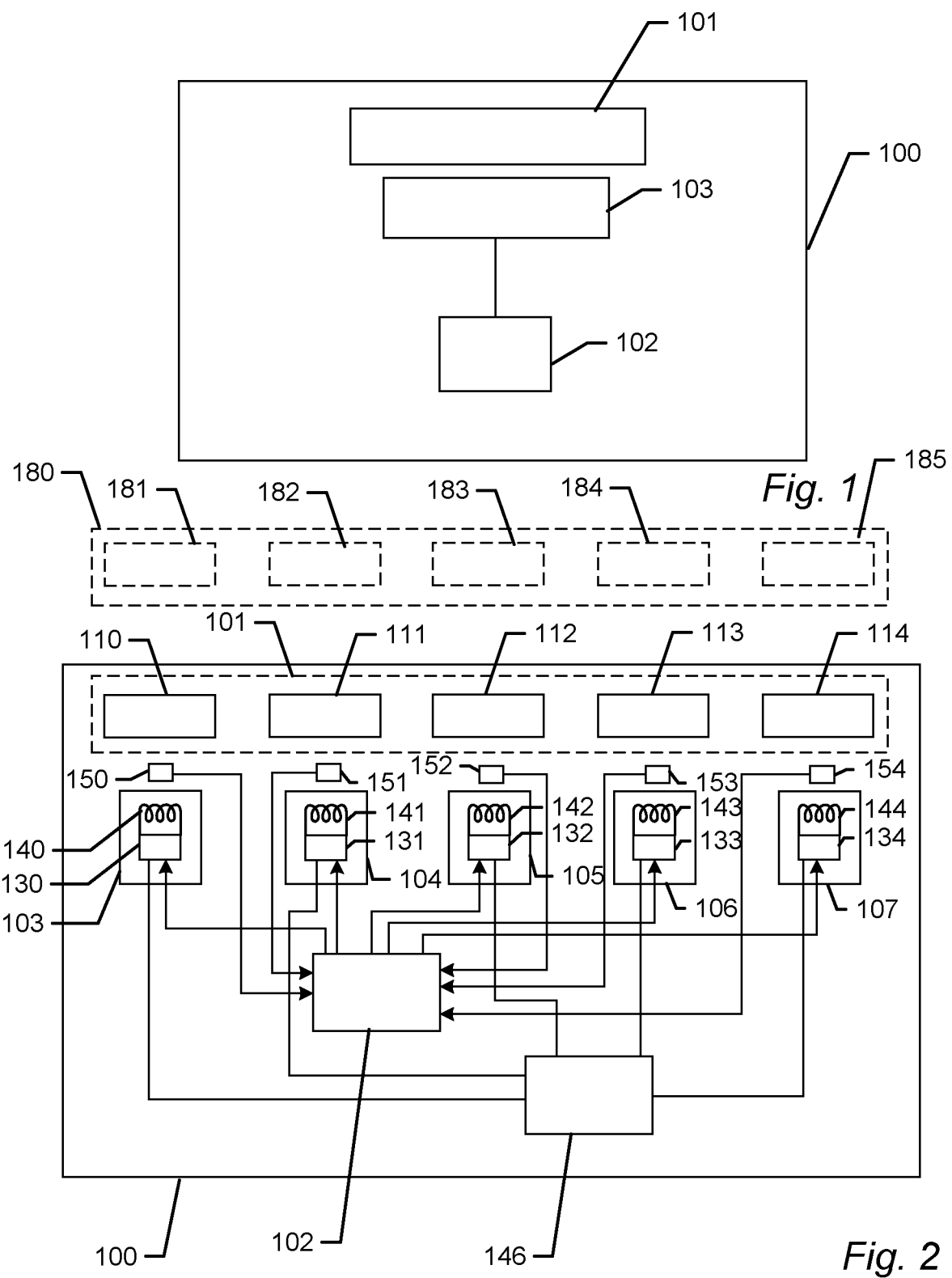

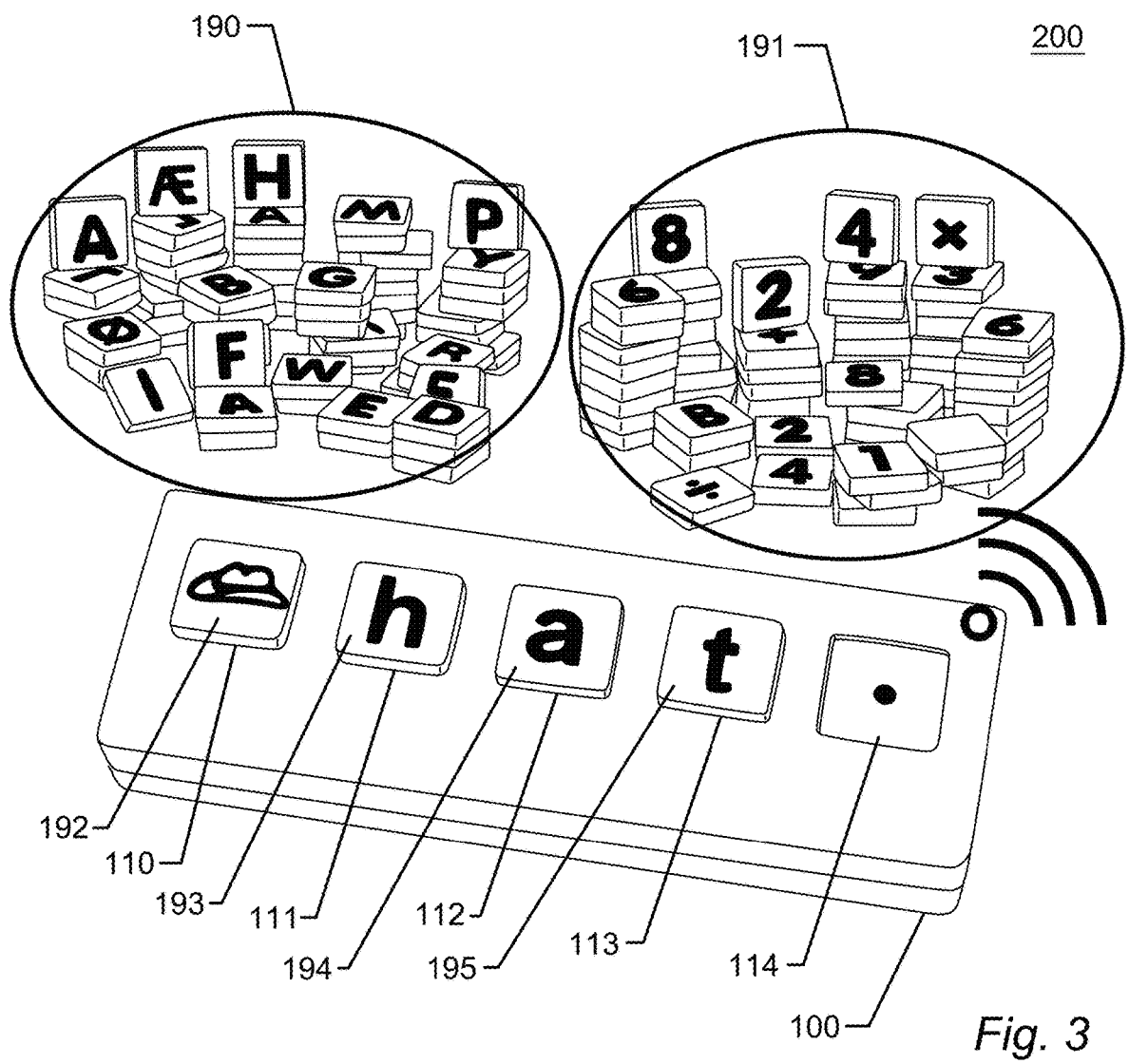
Fig. 3
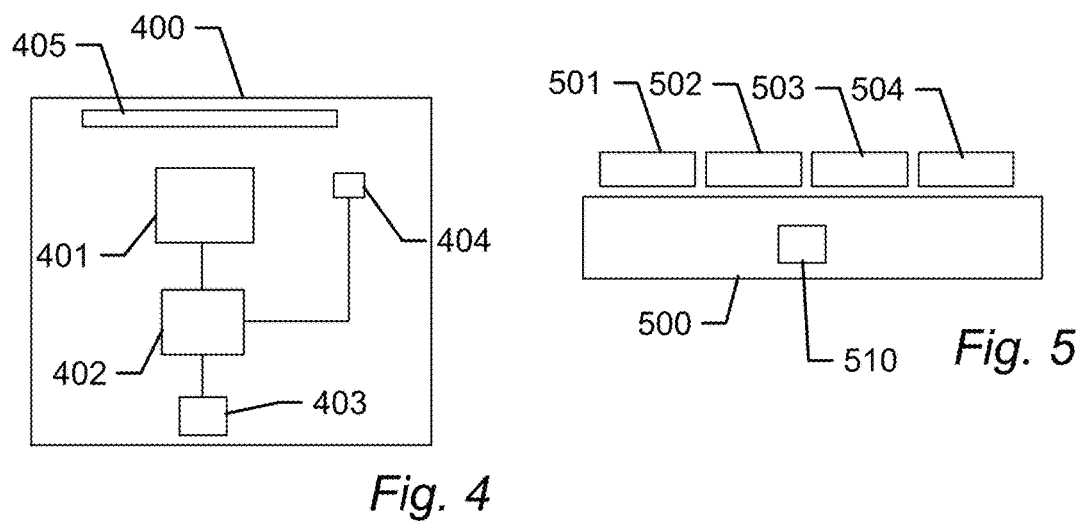
Fig. 4
Fig. 5

GAMING UNIT

CROSS-REFERENCE TO RELATED APPLICATIONS

The present application is a U.S. National Phase of International Patent Application No. PCT/DK2020/050073, which was filed on Mar. 19, 2020 and claims the benefit and priority of Danish Patent Application No. 201970181 filed on Mar. 25, 2019. The contents of the above applications are incorporated herein by reference in their entirety.

FIELD

The present invention relates to a gaming unit, a gaming system, and a set of playing pieces.

BACKGROUND

Playing games is an effective way for all people to learn especially children. Electronic gaming units have the advantage that they can be reprogramed and thereby used for an endless number of different games.

Electronic gaming units such as tablets or smart phones typically comprises a display e.g. a touch screen, used for receiving input from the user and provide feedback. However, displays has the disadvantage that they draw the attention of the users making them unaware of their surroundings. This effect is especially strong for young children making display based gaming unsuitable for playing in groups in schools or day-care. Displays are furthermore costly, fragile and may require significant power.

Thus there is a need for electronic gaming units/systems that encourage group interaction and that can provide immediate feedback to the users.

SUMMARY

According to a first aspect the invention relates to a gaming unit for a gaming system, the gaming system comprising the gaming unit and a plurality of playing pieces, each playing piece of the plurality of playing pieces comprising a magnet and having an identifier, wherein the gaming unit comprises:
- a play zone for arranging one or more playing pieces of the plurality of playing pieces on the gaming unit;
- a control unit; and
- a first magnetic unit configured to generate or alter a magnetic field for magnetically affecting one or more playing pieces arranged in the play zone, the first magnetic unit being operationally connected to the control unit, wherein the control unit is configured to detect the identifier of a playing piece arranged in the play zone and responsive to the detection of one more particular identifiers generate a control signal controlling the first magnetic unit to generate or alter a magnetic field thereby magnetically affecting one or more playing pieces in the play zone.

Consequently, by using a magnetic unit a selected playing piece may be actuated in an easy manner thereby providing immediate feedback to a user.

Each playing piece is preferably provided with a permanent magnet. Alternatively, each playing piece or some playing pieces may be provided with an electromagnet. The identifier may any type of identifier e.g. a RF based identifier, an optical based identifier or a magnetic based identifier. As an example each playing piece may be provided with a magnet with a different magnetic strength allowing the playing pieces to be identified by measuring the magnetic strength of their magnet. The gaming unit may be provided with a sensor configured to detect the identifier e.g. an RF based sensor, an optical sensor or a magnetic sensor. The control unit may be configured to detect the identifier of a playing piece by receiving sensor signals from a sensor operationally connected to the control unit. The gaming unit may comprise a battery configured to power the electronic components of the gaming unit e.g. the control unit and the first magnetic unit. The play zone may comprise one or more substantially flat surfaces for supporting a play piece. The play zone may be configured to receive a single playing piece or a plurality of playing pieces. The gaming unit may comprise an outer housing having a bottom and top opposite to the bottom, wherein the play zone is arranged at the top.

In some embodiments, the identifier of each playing piece of the plurality of playing pieces is a RFID tag and the gaming unit comprises an RFID sensor operationally connected to the control unit, the RFID sensor being configured to read the RFID tag of the playing piece arranged in the play zone and responsive thereto send a sensor signal to the control unit indicative of the read RFID tag.

The RFID tag may be an active RFID tag or a passive RFID tag, i.e. a RFID tag the does not require a power source in the playing piece. The RFID tag is preferably a passive RFID tag.

The first magnetic unit is preferably an electromagnetic unit. This allows the gaming unit to move/actuate the playing pieces without having any movable parts.

Alternatively, the first magnetic unit may comprise a permanent magnet and an actuator configured to rotate and/or move the permanent magnet whereby the magnetic field of the permanent magnet may be altered.

In some embodiments the first magnetic unit is configured to magnetically alter the one more playing pieces in the play zone by magnetically repelling the one or more playing pieces and/or magnetically attracting the one or more playing pieces.

In some embodiments the first magnetic unit is configured to magnetically affect the one more playing pieces in the play zone by magnetically repelling the one or more playing pieces.

In some embodiments the first magnetic unit is configured to magnetically affect the one more playing pieces in the play zone by magnetically attracting the one or more playing pieces.

In some embodiments, the first magnetic unit is configured to physically move the one or more playing pieces arranged in the play zone.

In some embodiments, the control unit is configured to generate a control signal configured to control the first magnetic unit to generate a time varying magnetic field configured to vibrate the one or more playing pieces arranged in the play zone.

The one or more particular identifier may correspond to a subset of the plurality of playing pieces. Thus, during a game, the control unit may only take an action if a playing piece of the subset of playing pieces is arranged in the play zone by the user. The control unit may be configured to take an action only if an "incorrect" play piece is arranged in the play zone. Alternatively, the control unit may be configured to take an action only if an "correct" play piece is arranged in the play zone. There exists also the possibility that the control unit takes a first action if a "correct" playing piece is arranged in the play zone and a second action if an incorrect playing piece is arranged in the play zone. The first action may be to control the first magnetic unit to vibrate the playing piece and the second action may be to control the first magnetic unit to repel the playing piece out of the play zone.

In some embodiments, the gaming unit further comprising a second magnetic unit operationally connected to the control unit and wherein the play zone comprises a first subzone and a second subzone, the first subzone and the second subzone each being configured to receive a playing piece of the plurality of playing pieces, and wherein the first magnetic unit is configured to generate or alter a magnetic field for magnetically affecting a playing piece arranged in the first subzone, the second magnetic unit is configured to generate or alter a magnetic field for magnetically affecting a playing piece arranged in the second subzone, wherein the control unit is configured to detect the identifier of a playing piece arranged in the first subzone and the identifier of a play piece arranged in the second subzone and responsive to the detection of a particular identifier or a particular combination of identifiers generate a control signal controlling the first magnetic unit and/or the second magnetic unit to generate or alter a magnetic field whereby playing pieces in the first subzone and/or in the second subzone are magnetically affected.

Consequently, more complex feedback may be provided. This also allows more complex games to be played.

The play zone may comprise more subzone e.g. at least 3, 4 or 5 subzones with each subzone being provided with a magnetic unit. Each subzone may be configured to receive a single playing piece. A subzone may be arranged with a distance to its neighboring subzone(s), i.e. a subzone may not about its neighboring subzone(s). The center of each subzone may be arranged on a common axis. Alternatively, the subzones may be arranged in a two-dimensional matrix structure or in any other structure e.g. in a circle or triangle.

In some embodiments a proximity zone is provided above the play zone and the control unit is further configured to detect an identifier of a playing piece held in the proximity zone and in response to the detection generate a control signal controlling the first magnetic unit to generate or alter a magnetic field thereby magnetically affecting the playing piece held in the proximity zone. Consequently, a user may be provided with tactile feedback while the playing piece is held above to playing zone.

The proximity zone may comprise a plurality of proximity subzones, one for each play zone subzone, where the control unit is configured to detect in which proximity subzone the playing piece is being held.

In some embodiments the control unit in response to the detection of the identifier in the proximity zone is configured to generate a control signal out of a plurality of control signals whereby the gaming unit may provide different feedback to a user.

The different feedback to the user may signal that a wrong playing piece is held in the proximity zone, a right playing piece is held in the proximity zone, or a right playing piece is held in a wrong proximity subzone.

In some embodiment the control unit is configured to generate a control signal configured to control the first magnetic unit to generate a time varying magnetic field configured to vibrate the one or more playing pieces held in the proximity zone.

In some embodiments the center frequency of the time varying magnetic field is between 0.2-7000 Hz, 0.3-500 Hz or 0.5 and 60 Hz.

In some embodiment the gaming unit has a first side and a second side, and wherein one of the first side or the second side comprises magnetic and/or mechanic connection means for connecting the gaming unit with an additional gaming unit.

Consequently, by allowing multiple gaming units to be combined more complex games may be played. The process of connecting the gaming units may also be incorporated into particular games.

Connected gaming unit may be configured to exchange data before a game is started and/or during a game.

In some embodiments both the first side and the second side comprise magnetic and/or mechanic connection means for connecting one of the first side or the second side gaming unit with one of the first side or the second side of an additional gaming unit.

Consequently, more than two gaming units may be connected.

In some embodiments the second side is opposite to the first side.

Consequently, all gaming units may be identical and be connected to form an large combined gaming unit of any size.

In some embodiments, the control unit is configured to be in one of a plurality of states, each state of the plurality of states corresponds to a particular game, and wherein the control unit is configured to be set in a particular state of the plurality of states by detecting a particular identifier of a playing piece.

In some embodiments, the gaming unit further comprises a speaker operationally connected to the control unit, whereby audio feedback may be provided to the users.

According to a second aspect the invention relates to a set of playing pieces for use with a gaming unit as disclosed in relation to the first aspect of the invention, wherein the set of playing pieces comprises a plurality of playing pieces, each playing piece of the plurality of playing pieces comprising a magnet and having an identifier.

The playing pieces may have any shape. As an example, some or all playing pieces may be a figure e.g. a figure having a shape of a car, a character, an animal or the like.

In some embodiments, each playing piece is a tile having a bottom surface and a top surface opposite to the bottom surface, wherein a symbol is arranged on the top surface.

In some embodiments a first playing piece of the plurality of playing pieces comprises a playing piece control unit and a display configured to display an image, and wherein the playing piece control unit is configured to receive a signal from another unit and in response to the signal is configured to control the display to display a new image.

Consequently, by providing playing pieces with a display, the functionality of the playing pieces may be changed after the games has been provided to the user. This may allow the playing pieces to be used for new games.

The signal may be transmitted by the gaming unit, a docking station, a mobile terminal, i.e. the other unit may be the gaming unit, a docking station, a mobile terminal. The first playing piece may comprise a receiver operationally connected to the playing piece control unit and configured to receive the signal. The first playing piece may further comprise transmitter for allowing the playing piece control unit to transmit an acknowledgement signal to the other unit. The display may a low power consuming display e.g. a reflective display. The first playing piece may further comprise a power source for providing the display and the control unit with power.

The control unit may further be configured to, in response to the signal, change the identifier of the playing piece. This enable the system to provide the playing piece with a new functionality without the need of communicating with the gaming unit e.g. changing a registry/database accessible to the gaming unit.

The playing piece control unit may be provided with the new image from the other unit, e.g. the new image may be embedded in the signal. The set of playing pieces may comprise a plurality of playing pieces provided with a display and a playing piece control unit e.g. each playing piece of the plurality of playing pieces may comprise a display and a playing piece control unit.

According to a third aspect the invention relates to a gaming system comprising a gaming unit as disclosed in relation to the first aspect of the invention, and a set of playing pieces as disclosed in relation to the second aspect of the invention.

In some embodiments the gaming system further comprises a docking station, and wherein the docking station comprises a docking station control unit configured to detect and/or change the identifier of the first playing piece, and wherein the docking station control unit is configured to provide a signal for the first playing piece for controlling the display to display a new image.

If the identifier of the first playing piece is changed the first playing piece may directly be provided with a new functionality. However, the first playing piece may also be provided with a new functionality if the docking station detects the identifier of the first playing piece and then updates a database accessible to the gaming unit, where the database maps the identifier to the function of the first playing piece. The docking station may further be configured to recharge a power source of the first playing piece. The docking station may be configured to configured to be used with a plurality of playing pieces at the same time e.g. at least 3, 5, 10 or 20 playing pieces.

The different aspects of the present invention can be implemented in different ways including a gaming unit, a set of playing pieces and a gaming system described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependent claims. Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein:

FIG. 1 shows a schematic drawing of a gaming unit according to an embodiment.

FIG. 2 shows a schematic drawing of a gaming unit according to an embodiment.

FIG. 3 shows a drawing of a gaming system according to an embodiment.

FIG. 4 shows a schematic drawing of a playing piece according to an embodiment.

FIG. 5 shows a schematic drawing of a docking station according to an embodiment.

DETAILED DESCRIPTION

In the following description, reference is made to the accompanying figures, which show by way of illustration how the invention may be practiced.

FIG. 1 shows a schematic drawing of a gaming unit 100 according to an embodiment. The gaming unit 100 is a gaming unit fora gaming system, the gaming system comprising the gaming unit 100 and a plurality of playing pieces, each playing piece of the plurality of playing pieces comprising a magnet and having an identifier. The gaming unit 100 comprises a play zone 101 for arranging one or more playing pieces of the plurality of playing pieces on the gaming unit 100, a control unit 102, and a first magnetic unit 103. The first magnetic unit 103 being configured to generate or alter a magnetic field for magnetically affecting one or more playing pieces arranged in the play zone 101, the first magnetic unit 103 being operationally connected to the control unit 102. The control unit 102 being configured to detect the identifier of a playing piece arranged in the play zone 101 and responsive to the detection of one more particular identifiers generate a control signal controlling the first magnetic unit 103 to generate or alter a magnetic field thereby magnetically affecting one or more playing pieces in the play zone 101.

FIG. 2 shows a schematic drawing of a gaming unit 100 according to an embodiment. The gaming unit 100 is a gaming unit fora gaming system, the gaming system comprising the gaming unit 100 and a plurality of playing pieces, each playing piece of the plurality of playing pieces comprising a magnet and having an identifier. The gaming unit 100 comprises play zone 101 for arranging one or more playing pieces of the plurality of playing pieces on the gaming unit 100, a control unit 102, a first magnetic unit 103, a second magnetic unit 104, a third magnetic unit 105, a fourth magnetic unit 106, a fifth magnetic unit 107, and a battery 146. Each magnetic unit 103-107 is an electromagnetic unit comprising a coil 140-144 and an electrical switching device 130-134. The coils 140-144 may be wind around a core made of a magnetic material. Alternatively, an air core may be used. The coils 140-144 are electrically connectable to the battery 146 via the electrical switching devices 130-134 as shown in the drawing. The electrical switching devices 130-134 are operationally connected to the control unit 102 and configured to be operated in response to control signals generated by the control unit 102. The play zone 101 comprises a first subzone 110, a second subzone 111, a third subzone 112, a fourth subzone 113 and a fifth subzone 114, each subzone 110-114 being configured to receive a playing piece of the plurality of playing pieces. The gaming unit further comprising a first sensor 150 configured to detect the identifier of a playing piece arranged in the first subzone 110, a second sensor 152 configured to detect the identifier of a playing piece arranged in the second subzone 111, a third sensor 152 configured to detect the identifier of a playing piece arranged in the third subzone 113, a fourth sensor 153 configured to detect the identifier of a playing piece arranged in the fourth subzone 113, and a fifth sensor 154 configured to detect the identifier of a playing piece arranged in the fifth subzone 114. Each sensor 150-154 being operationally connected to the control unit 102 and configured to provide the control unit 102 with sensor signals. Each sensor 150-154 may be operationally connected to the control unit 102 via a common multiplexer. The control unit 102 is configured to detect the identifier of a playing piece arranged in a subzone 110-114 and further detect which subzone the playing piece is arranged in. The sensors 150-154 may be RFID sensors. In other embodiment, the gaming unit may only comprise a single sensor configured to determine the identifier of a playing piece arranged in one of the subzones 110-114, wherein the control unit is configured to detect which subzone a playing piece is arranged in by analyzing the sensor signal received from the single sensor e.g. by analyzing the signal strength or by using an additional sensor signal e.g. provided by an additional sensor or by the magnetic units 103-107 e.g. the magnetic units may be used to detect the presence of a magnetic playing piece arranged in a subzone. The control unit 102 is configured to, responsive to the detection of a particular identifier in a particular subzone or a particular combination of identifiers in particular subzones, generate one or more control signals, controlling one or more of the magnetic units 103-107 to generate or alter a magnetic field whereby playing pieces arranged in one or more of the subzones 110-114 are magnetically affected. The controls signals are send to the electrical switching devices 130. The electrical switching device may be simple electrical switches or more complex switching devices e.g. signal generators, capable of turning the direction of the current running through the coils 140-144 whereby the magnetic polarity may be switched. The electrical switching devices 130-134 are arranged proximal to the coils 140-144 however they may also be arranged distal to the coils 130-134 e.g. proximal to the battery 146 or the control unit 102. The control unit 102 and the electrical switching devices 130-134 may also be combined into a combined unit. A proximity zone 180 may be provided above the play zone 101 and where the control unit 102 is further configured to detect an identifier of a playing piece held (by the users hand) in the proximity zone and in response to the detection generate a control signal controlling the first magnetic unit to generate or alter a magnetic field thereby magnetically affecting the playing piece held in the proximity zone. The proximity zone 180 may further comprise a plurality of proximity subzones 181-185, one for each play zone subzone 110-114, where the control unit 102 is configured to detect in which proximity subzone 181-185, e.g. using the sensors 150-154, the playing piece is being held.

FIG. 3 shows a gaming system 200 according to an embodiment of the invention. The gaming system 200 comprises a gaming unit 100 and a plurality of playing pieces 190-195. Each playing piece of the plurality of playing pieces 190-195 comprises a magnet and has an identifier. The gaming unit 100 functionally correspond to the gaming unit disclosed in relation to FIG. 2. In this embodiment, the subzones 110-114 are concave and have a shape matching the outer shape of a playing piece. Each playing piece 190-195 is a tile having a bottom surface and a top surface opposite to the bottom surface, where a symbol is arranged on the top surface, i.e. a symbol is printed on the top surface. The control unit 102 is configured to be in one of a plurality of states, each state of the plurality of states corresponds to a particular game, and wherein the control unit 102 is configured to be set in a particular state of the plurality of states by detecting a particular identifier of a playing piece. Thus, the user may select a particular game by arranging a particular playing piece in one of the subzones 110-114. It may be only some of the playing pieces that are cable of setting the control unit 102 in a particular state. FIG. 3 illustrated an example of a game, that may be played with the playing system 200. The game is a spelling game. The game is selected by arranged the playing piece 192 in the subzone 110. When the playing piece 192 is arranged in the first subzone 110, the sensor 150 reads the identifier of the playing piece 192 and sends a sensor signal to the control unit 102 whereby the control unit 102 it set in a state corresponding to the spelling game "hat". The playing piece 192 is provided with a symbol of a hat on its top surface. The purpose of this game is to spell to the word "hat". The plurality of playing pieces comprises a group of playing pieces 190 where the symbol on the top surface is a letter. The user initiates the game by arranging a first playing piece 193 with a particular letter in the second subzone 111. In this particular example the first playing piece has the letter "h" printed on its top surface. Thus the user has selected the correct first letter. If the control unit 102, in this game is configured to provide feedback to the user when a correct first playing piece is selected, it may send a control signal to the switching device 131 of the second electromagnetic unit 104, controlling the switching device 131 to provide a current from the battery 146 to the coil 141 whereby the playing piece 193 may move slightly. However, the control unit may also be configured to only provide feedback if an incorrect playing piece is arranged in the second subzone 111 e.g. by magnetically repelling the incorrect playing piece from the second subzone. There exists also the possibility that control unit 102 is configured to provide a first type of feedback if a correct playing piece is selected and a second type of feedback if an incorrect playing piece is selected e.g. a correct playing piece may be slightly vibrated using magnetic forces whereas an incorrect playing piece may be by magnetically repelled from the subzone. Once the user has completed the game, by correctly arranging the three playing pieces 193-195 in the correct subzone 111-113 the control unit 102 may be configured to provide feedback to a user e.g. by magnetically slightly vibrating the three playing pieces 193-195. The shown plurality of playing pieces 190-195 further comprises a group playing pieces 191 where the symbol on the top surface is a number. This group of playing pieces 191 may be used for playing math games. However, further groups of playing pieces may be used e.g. with images of animals, images of products, etc. Thus the possible games that may be played with the gaming system 200 is basically endless. The gaming unit may also comprise more subzone than 5 e.g. 10, 20, 50, or 100. Furthermore, there exists the possibility that the gaming system 200 comprises more gaming units that may be communicatively coupled to each other.

FIG. 4 shows a schematic drawing of a playing piece 400 according to an embodiment. The playing piece comprises a magnet 405, an identifier 404, a playing piece control unit 402 and a display 401 configured to display an image, and wherein the playing piece control unit 402 is configured to receive a signal from another unit, e.g. using a transmitter/receiver 403, and in response to the signal is configured to control the display 401 to display a new image.

FIG. 5 shows a schematic drawing of a docking station 500 according to an embodiment. The docking station 500 comprises a docking station control unit 510 configured to detect and/or change identifiers of the playing pieces 501-504. The docking station control unit 510 is further configured to provide a signal for the playing pieces 501-504 for controlling a display of the playing pieces 501-504 to display a new image. The docking station 500 may further be configured to provide a power source of the playing pieces with power.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A gaming unit for a gaming system, the gaming system comprising the gaming unit and a plurality of playing pieces, each playing piece of the plurality of playing pieces comprising a magnet and having an identifier, wherein the gaming unit comprises:
    a play zone for arranging one or more playing pieces of the plurality of playing pieces on the gaming unit;
    a control unit; and
    a first magnetic unit configured to generate or alter a magnetic field for magnetically affecting one or more playing pieces arranged in the play zone, the first magnetic unit being operationally connected to the control unit,
wherein the control unit is configured to detect the identifier of a playing piece arranged in the play zone and responsive to the detection of one more particular identifiers generate a control signal controlling the first magnetic unit to generate or alter a magnetic field thereby magnetically affecting one or more playing pieces in the play zone; and
wherein the control unit is configured to be in one of a plurality of states, each state of the plurality of states corresponds to a different game, wherein the control unit is configured to be set in a first particular state of the plurality of states by detecting a particular identifier of a first playing piece, and wherein the control unit is configured to be set in a second particular state of the plurality of states by detecting a particular identifier of a second playing piece.

2. A set of playing pieces for use with the gaming unit according to claim 1, wherein the set of playing pieces comprises a plurality of playing pieces, each playing piece of the plurality of playing pieces comprising a magnet and having an identifier, wherein a first playing piece of the plurality of playing pieces comprises a playing piece control unit and a display configured to display an image, and wherein the playing piece control unit is configured to receive a signal from another unit and in response to the signal is configured to control the display to display a new image.

3. A gaming system comprising a gaming unit according to claim 1 and a set of playing pieces for use with the gaming unit, the set of playing pieces comprising a plurality of playing pieces, each playing piece of the plurality of playing pieces comprising a magnet and having an identifier.

4. The gaming system according to claim 3, wherein:
    a first playing piece of the plurality of playing pieces comprises a playing piece control unit and a display configured to display an image;
    the playing piece control unit is configured to receive a signal from another unit and in response to the signal is configured to control the display to display a new image;
    the gaming system further comprises a docking station; and
    the docking station comprises a docking station control unit configured to detect or change the identifier of the first playing piece; and
    the docking station control unit is configured to provide a signal for the first playing piece of the plurality of playing pieces for controlling the display to display a new image.

5. A gaming system according to claim 4, wherein the docking station control unit is configured to provide a game signal to the control unit of the gaming unit for enabling the control unit of the gaming unit to be in a new state corresponding to a new game.

* * * * *